United States Patent [19]
Vis et al.

[11] Patent Number: 5,793,166
[45] Date of Patent: Aug. 11, 1998

[54] IMAGE DISPLAY DEVICE COMPRISING A CATHODE RAY TUBE

[75] Inventors: Petrus N. J. Vis; Adrianus A. J. Franken, both of Eindhoven, Netherlands

[73] Assignee: U.S. Philips Corporation, New York, N.Y.

[21] Appl. No.: 752,886

[22] Filed: Nov. 20, 1996

[30] Foreign Application Priority Data

Nov. 22, 1995 [EP] European Pat. Off. ............ 95203211

[51] Int. Cl.$^6$ ................. G09G 1/04; H01J 29/50; H04N 9/20
[52] U.S. Cl. ................. 315/383; 315/367; 313/409; 348/809
[58] Field of Search ................. 315/368.17, 367, 315/383; 313/409, 413, 426; 348/715, 809, 704, 448

[56] References Cited

U.S. PATENT DOCUMENTS

| | | | |
|---|---|---|---|
| 3,499,982 | 3/1970 | O'Neal, Jr. | 348/448 |
| 3,511,924 | 5/1970 | Goode | 348/809 |
| 4,633,244 | 12/1986 | Holtey et al. | 313/413 |
| 5,389,855 | 2/1995 | Chen | 315/368.17 |
| 5,668,602 | 9/1997 | Sid-Ahmed | 348/448 |

FOREIGN PATENT DOCUMENTS

| | | |
|---|---|---|
| 0307524 | 3/1989 | European Pat. Off. |
| 0454455A2 | 10/1991 | European Pat. Off. |
| 0454455A3 | 10/1991 | European Pat. Off. |
| 2227911 | 8/1990 | United Kingdom |
| 9619899 | 6/1996 | WIPO |

*Primary Examiner*—Gregory C. Issing
*Attorney, Agent, or Firm*—Jack D. Slobod

[57] ABSTRACT

An image display device (1) which includes a cathode ray tube is provided with a cathode system (2) for the emission of a plurality of electron beams (3) whereby a phosphor screen (4) is scanned in order to display an image. The electron beams are modulated on the basis of an electronic image signal by means of a cathode modulator (5). The cathode modulator is arranged to scan different image lines simultaneously by means of separate electron beams. For example, the cathode modulator comprises an extension system (7) and a delay system (8) for deriving extended and delayed extended image line sections from image line sections of the electronic image signal. The cathode modulator also comprises a combination unit (9) for simultaneously supplying an extended image line section and a delayed image line section with which separate electron beams are modulated.

13 Claims, 2 Drawing Sheets

IMAGE DISPLAY DEVICE COMPRISING A CATHODE RAY TUBE

BACKGROUND OF THE INVENTION

1. Field of the Invention

The invention relates to an image display device, including a cathode system for the emission of a plurality of electron beams, a phosphor screen which is arranged opposite the cathode system, a cathode modulator for modulating the electron beams on the basis of an electronic image signal, and a deflection system for scanning the phosphor screen by means of the electron beams. The invention also relates to an X-ray examination apparatus including such an image display device.

2. Description of the Related Art

An image display device of the kind set forth is known from UK Patent Application GB 2 227 911.

In situations where small details must be made suitably visible in the displayed image it is important not only that the image is displayed with a high brightness but also that the image display device has a high spatial resolution.

The cathode modulator of the known image display device serves to modulate the intensities of the electron beams emitted by the electron sources. The modulation is performed on the basis of the electronic image signal, so that in hte phosphor screen the electron beams produce light with brightness variations which represent the image information in the electronic image signal. The cathode modulator of the known image display device is arranged to utilize the individual electron beams so as to generate light twice in rapid succession in substantially the same positions on the phosphor screen. The two electron beams generate the same image twice in rapid succession so that overloading of the phosphor material is prevented when an image is displayed on the phosphor screen with a high brightness. The cited publication also mentions that the use of separate electron beams instead of a single electron beam offers the advantage that a high brightness is achieved for the image displayed without the intensity of the electron beams becoming so high that accurate deflection becomes impossible. Even though the known image display device enables sharp display of an image of high brightness, the spatial resolution of the image display device is not enhanced.

SUMMARY OF THE INVENTION

It is an object of the invention to provide an image display device having a spatial resolution which is higher than that of a known image display device.

This object is achieved by means of an image display device in accordance with the invention which is characterized in that the cathode modulator is arranged to scan separate image lines on the phosphor screen substantially simultaneously by means of separate electron beams.

The electronic image signal comprises a multitude of successive image line sections, each of which relates to an image line. Each image line contains a large number of pixels, for example 2,000, and an image contains a large number of, for example 2,000 image lines also. The numbers of image lines and pixels per image line represent the spatial resolution of the electronic image signal. The cathode modulator separately modulates each of the electron beams and separate image lines on the phosphor screen are scanned thereby. The separate beams generate separate image lines on the phosphor screen substantially simultaneously. The scanning of one image line on the phosphor screen by means of one electron beam is partly or completely coincident with the scanning of another image line by another electron beam. Because the phosphor material has a given persistence or afterglow, the one image line will remain suitably visible, be it for a comparatively short period of time, after completion of the scanning of said one image line. During said comparatively short period of time the scanning of the other image line can be briefly continued, the observer nevertheless seeing an image without disturbing flicker. The individual image lines are preferably scanned substantially simultaneously so as to minimize flicker in the image. Because separate image lines of high resolution are generated substantially simultaneously on the phosphor screen, a comparatively long period of time is available for the scanning of the separate image lines, so that the modulation frequency of the individual electron beams may be much lower than the modulation frequency of the electronic image signal. As more image lines are scanned substantially simultaneously, a smaller fraction of the modulation frequency of the electronic image signal can be used as the modulation frequency of the separate electron beams, the image nevertheless being displayed with substantially the resolution of the electronic image signal. Because it is not necessary to modulate the electron beams with particularly high frequencies in order to display the image with a high resolution, comparatively simple and hence inexpensive electronic components can be used to control the cathode modulator.

Moreover, only a short period of time is required to display a complete image because a plurality of image lines are scanned substantially simultaneously. The more image lines are scanned simultaneously, the less time will be required to display an image. Therefore, an image display device in accordance with the invention is suitable for displaying a series of images in rapid succession with a high resolution and without disturbances.

For example, using a number of N electron beams separate image lines are simultaneously scanned by scanning image lines having serial number 1 modulo N by means of a first electron beam, by scanning all image lines having serial number 2 modulo N substantially simultaneously by means of a second electron beam, etc. In the present example a modulation frequency is used for the electron beams which is approximately N times lower than the modulation frequency of the electronic image signal. Furthermore, approximately N times as much time is available for the scanning of each image line in comparison with the use of only a single electron beam for the scanning of the phosphor screen. Because the phosphor screen is scanned comparatively slowly by means of several electron beams, nevertheless only a short period of time is required for the display of a complete image.

A preferred embodiment of an image display device in accordance with the invention is characterized in that the cathode modulator comprises an extension system for extending image line sections of the electronic image signal, a combination unit for supplying an extended delayed image line section and an extended image line section substantially simultaneously and a delay system which is arranged to cooperate with the extension system in order to derive delayed extended image line sections from image line sections.

Each of the image line sections contains image information, for example grey or color values, of each of the pixels in the relevant image line. Therefore, the electronic image signal which contains image information concerning small image details includes components which vary at a very high frequency, for example 500 MHz. The extension system derives from an image line section an extended image line section which contains the same image information but varies substantially more slowly. In cooperation with the extension system the delay unit supplies the cathode modulator with a delayed extended image line section substantially simultaneously with the extended image line section.

A further preferred embodiment of an image display device in accordance with the invention is characterized in that the extension system comprises a memory with a repeater unit.

Separate image line sections are stored in the memory and each signal amplitude relating to a pixel is repeated by the repeater unit, thus forming an extended image line section with a repetition of equal signal amplitudes for each pixel. As the signal amplitudes are repeated more often, the image line section is extended further. The cathode modulator is thus provided with an extension unit by using simple and hence inexpensive components.

A further preferred embodiment of an image display device in accordance with the invention is characterized in that the extension unit comprises a memory with an interpolation unit.

Separate image line sections are stored in the memory and signal amplitudes having values intermediate of the signal amplitudes of the image line sections stored are inserted by means of the interpolation unit. The inserted signal amplitudes have values which are calculated by interpolation from signal amplitudes wherebetween insertion takes place. As more interpolated signal amplitudes are inserted, the image line section is extended further. An interpolation unit counteracts artificial acute variations in the signal level of the extended image line section. The cathode modulator is thus provided with an extension unit by using simple and hence inexpensive components.

A further preferred embodiment of an image display device in accordance with the invention is characterized in that the cathode modulator is arranged to scan odd image lines by means of a first electron beam and even image lines by means of a second electron beam, an even and an odd image line being scanned substantially simultaneously.

Because even and odd image lines are scanned substantially simultaneously on the phosphor screen, in comparison with the case where the image lines are scanned by means of only a single electron beam, with the same time during which a complete image is displayed an approximately twice as long period of time is available for the scanning of separate image lines. Furthermore, preferably neighboring image lines are substantially simultaneously scanned so that the separate electron beams are deflected to neighboring positions on the phosphor screen. This enables uncomplicated control of the deflection system.

The image display device in accordance with the invention is particularly suitable for use in an X-ray examination apparatus. The X-ray examination apparatus comprises an X-ray source for irradiating a patient to be examined by means of an X-ray beam so as to form an X-ray image. The X-ray examination apparatus also comprises an X-ray detector for deriving the electronic image signal from the X-ray image. In order to display the information of the X-ray image with a high diagnostic quality, the electronic image signal is applied to the image display device in accordance with the invention. The image information of the X-ray image is displayed on the phosphor screen with a high resolution so that small image details are very well visible.

Consequently, an image of high diagnostic quality is obtained. For example, small deviations in the anatomy of the patient to be examined can be suitably observed in the image on the phosphor screen.

These and other aspects of the invention will be apparent from and elucidated with reference to the embodiments described hereinafter.

DESCRIPTION OF THE PREFERRED EMBODIMENTS

Figure 1:
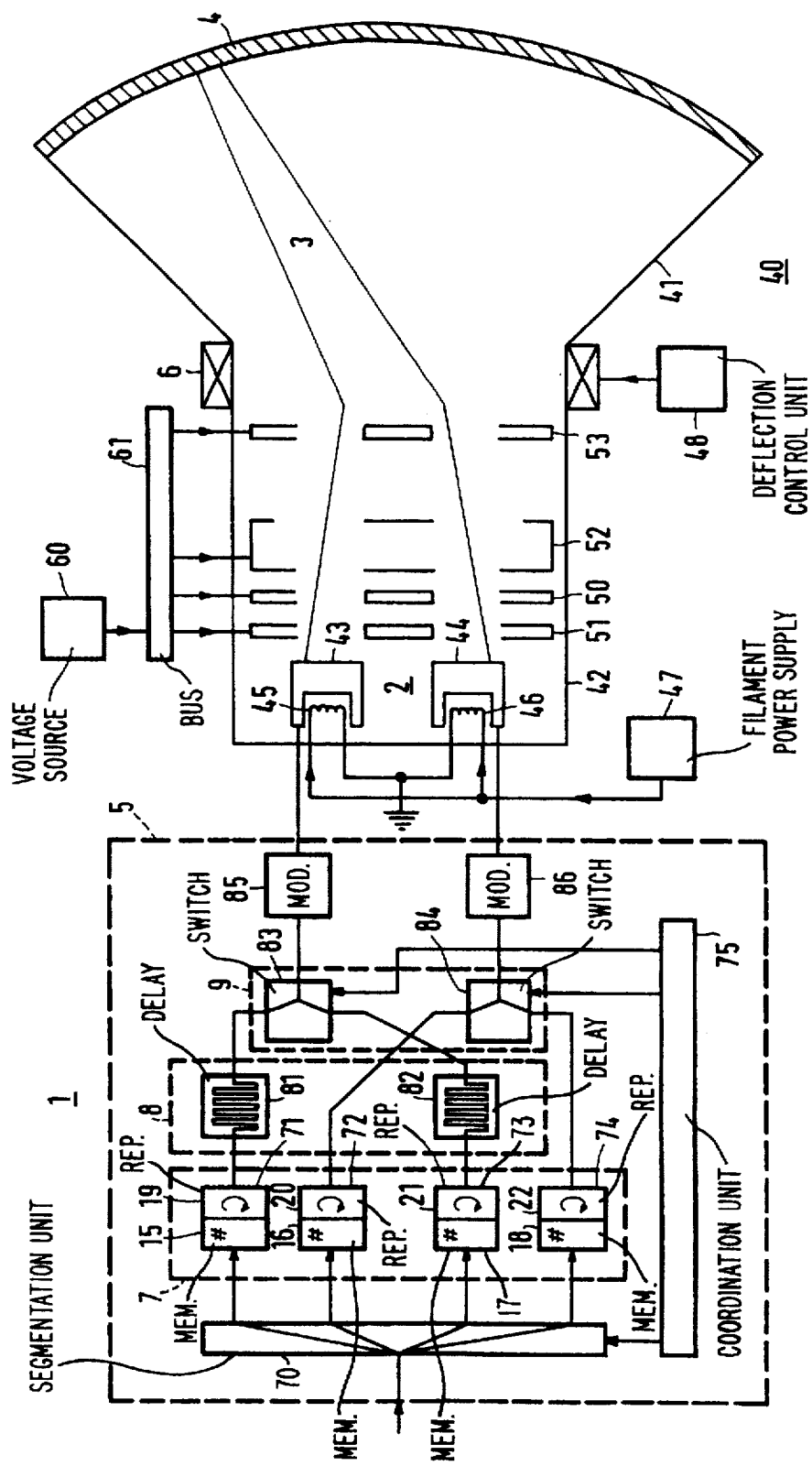
FIG. 1 shows diagrammatically an image display device in accordance with the invention.

FIG. 1 shows diagrammatically an image display device in accordance with the invention. The cathode ray tube 40 comprises a vacuum envelope 41. The cathode system 2 comprising two separate electron sources 43, 44, is accommodated in the neck 42 of the vacuum envelope. Each of the electron sources comprises a filament 45, 46 coupled to a power supply unit 47. The electron sources 43 and 44 emit electron beams 3 which are deflected by the deflection system so as to scan the phosphor screen 4 provided on the inner side of the vacuum envelope 41, opposite the cathode system 2. The deflection system 6 comprises deflection coils wherethrough an electric current is conducted under the control of a control unit 48. Light is locally generated in the phosphor screen by absorption of an electron beam in the phosphor material, said light having an intensity which is dependent on the intensity of the electron beam. The cathode material of the electron sources is heated by application of an electric current to the filaments 45 and 46 so that the cathode material emits electrons. The cathode system also comprises a number of electrodes so as to form the emitted electrons into electron beams. Openings for the passage of the electron beams are provided in the electrodes. In front of the cathodes there is arranged an accelerator electrode 50 whereto a cathode voltage of approximately 0.7 kV is applied by a voltage source 60. A grid 51 is arranged between the electron sources 43 and 44 and the accelerator electrode 50. The electron sources 43, 44, the grid 51 and the accelerator electrode 50 operate as a triode and the intensity of the electron beams is controlled on the basis of a small voltage difference of a few tens of volts between the individual electron sources and the grid 51. The cathode system also comprises a focusing electrode 52 and an anode 53, carrying a high voltage of approximately 25 kV, for further acceleration and focusing of the electron beams on the phosphor screen. For excitation the electrodes 50, 51, 52, 53 are coupled to the voltage source 60 via a bus 61. The foregoing description concerns a comparatively simple embodiment of the cathode system 2, but to those skilled in the art it will be evident that more complex configurations of electrodes can be used in the cathode system, for example in order to enhance the properties of the electron beams, if desired. The deflection system is arranged to scan different image lines on the phosphor screen 4 substantially simultaneously by means of separate electron beams. For example, the odd image lines are scanned by means of one electron beam whereas the even image lines are scanned by means of the other electron beam.

The cathode modulator 5 comprises a segmentation unit 70 which divides an electronic image signal into separate image line sections. The electronic image signal contains image information of a high-resolution image, for example an image comprising 2,000×2,000 pixels. For an image frequency of 76 Hz (76 images per second) the electronic image signal has a line frequency of approximately 160 kHz and the bandwidth of the electronic image signal then preferably amounts to approximately 400 MHz or even 500 MHz. The separate image line sections are applied to the extension system 7 which comprises a number of extension units 71, 72, 73, 74. Each extension unit comprises a memory unit 15, 16, 17, 18 and a repeater unit 19, 20, 21, 22. The extension unit 71 thus comprises a memory unit 15 and a repeater unit. The image line section of a first image line is applied to the extension unit 71 by the segmentation unit 70. The signal amplitudes of the image line section represent brightness values, for example grey or color values, of pixels in the relevant image line. The signal amplitudes are stored in the memory unit 15 and each signal amplitude is repeated by means of the repeater unit so that an extended image line section which contains the same image information as the image line section itself but has a smaller bandwidth, for example 250 MHz, appears on the output of the extension unit. Similarly, the segmentation unit applies a second, a third and a fourth image line section to the extension units 72, 73 and 74, respectively, which derive extended image line sections therefrom in the same manner as described above for the image line section for the first image line. The extended image line section of the second image line is applied to a cathode modulation circuit 86 via a switching unit 84. The cathode circuit 86 modulates the electron beam on the basis of the extended image line section. Because the bandwidth of the extended image line section is much smaller than that of the electronic image signal, the cathode circuit can be implemented by means of comparatively simple and hence inexpensive electronic components. In the electronic image signal the first image line section precedes the second image line section. Using a delay unit 81, the extended image line section supplied by the extension unit 71 is delayed by such an amount that the electron sources 43 and 44 are modulated substantially simultaneously with the extended delayed image line section, applied by the cathode modulation circuit 85 to the electron source 43 with the delay unit 81 via the switching unit 83, and with the extended image line section, respectively, applied to the electron source 44 by the cathode modulation circuit 86. As a result, the electron beams scan the first and the second image line on the phosphor screen substantially simultaneously.

The segmentation unit 70 applies a third image line section to the extension unit 73 which cooperates with a delay unit 82 so as to apply a delayed extended image line section for the third image line to the switching unit 83. The segmentation unit 70 applies a fourth image line section to the extension unit 73 and the extended image line section of the fourth image line is applied to the cathode modulation circuit 86 via the switching unit 84. The delay unit 82 delays the image line section of the third image line to such an extent that the electron sources 43 and 44 are modulated substantially simultaneously with the extended image line section of the fourth image line and the delayed extended image line section, respectively. As a result, the third and the fourth image line on the phosphor screen are scanned substantially simultaneously by means of the separate electron beams. When the third and the fourth image line have been scanned, the cathode modulator is ready to treat a fifth and a sixth image line section of the electronic image signal in exactly the same way as the first and the second image line section. Per image line the segmentation unit switches to a next extension unit; the switching units 83 and 84 switch to a different cathode modulation circuit 85, 86 every two image lines. The switching of the segmentation unit 70 and the switching units 83, 84 is controlled by means of a coordination unit 75 in such a manner that the extended image line sections and the delayed extended image line sections are applied to the relevant cathode modulation circuits 85, 86 in time and in the correct order. The processing of the image line sections of the electronic image signal is thus repeated until a complete image is displayed on the phosphor screen. A period of approximately 13 ms is available for the display of such an image; subsequently, a next image of a series may be displayed, if desired.

The extension units can be provided with interpolation units instead of repeater units. The interpolation units insert signal amplitudes. The inserted signal amplitudes have values between the values of signal amplitudes wherebetween insertion takes place. FIG. 1 shows, by way of example, a cathode ray tube comprising two electron sources whereby two image lines are substantially simultaneously scanned by means of two electron beams. It is alternatively possible to use three or even more electron sources whereby three or more image lines are substantially simultaneously scanned by means of three or more electron beams.

Figure 2:
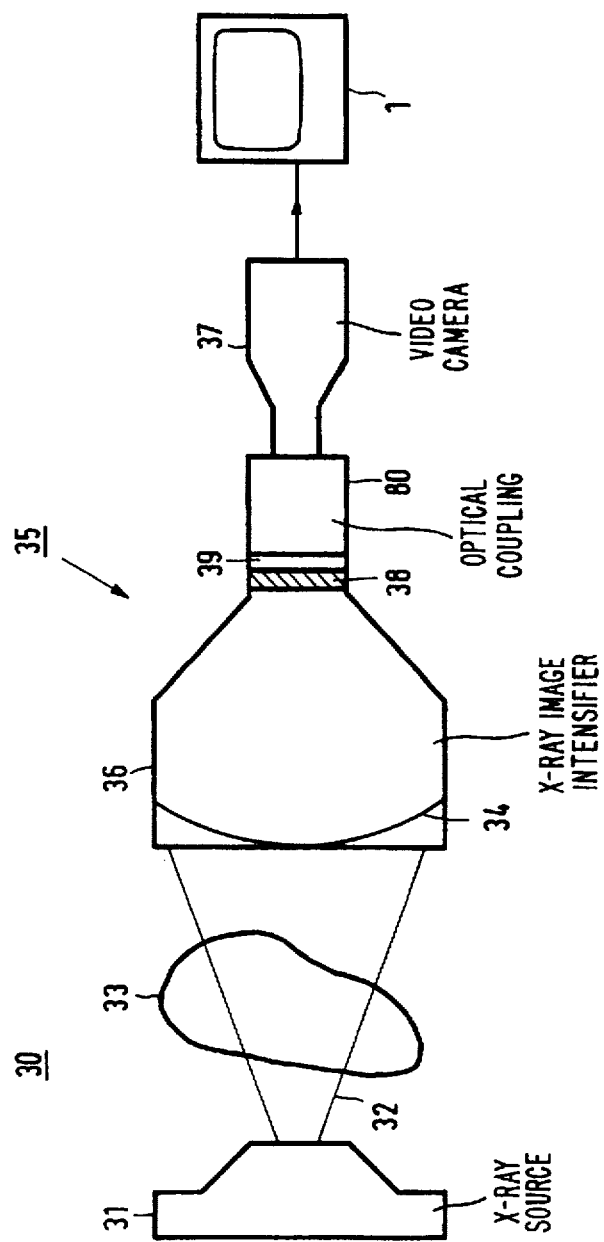
FIG. 2 shows diagrammatically an X-ray examination apparatus in accordance with the invention.

FIG. 2 shows diagrammatically an X-ray examination apparatus 30 in accordance with the invention. An X-ray source 31 emits an X-ray beam 32 for irradiating an object 33, for example a patient to be radiologically examined. Due to local differences in X-ray absorption within the patient an X-ray image is formed which is incident on an X-ray sensitive surface 34 of an X-ray detector 35. The X-ray detector is, for example an image intensifier television chain which comprises an X-ray image intensifier 36 and a video camera 37. The X-ray sensitive surface 34 is formed by the entrance screen of the X-ray image intensifier which derives an electron beam from the incident X-rays. The electron beam is imaged on a phosphor layer 38 on the exit window 39 via an electron-optical system. The incident electron beam generates light in the phosphor layer, thus forming a light image on the exit window. The video camera is coupled to the exit window 39 by means of an optical coupling 80, for example a lens system. The video camera 37 picks up the light image and the electronic image signal derived from the light image is applied to the image display device 1. The image display device 1 displays a high-resolution image of the information of the X-ray image, so that small details can be suitably observed.

We claim:

1. An image display device, comprising:

a cathode system for the emission of a plurality of electron beams, a phosphor screen, a cathode modulator for modulating the electron beams on the basis of an electronic image signal, and a deflection system for scanning the phosphor screen by means of the electron beams, characterized in that the cathode modulator is arranged to modulate individual electron beams separately, and that the deflection system is arranged to scan respective parts of plural image lines on the phosphor screen substantially simultaneously by means of separate electron beams, and in that the cathode modulator comprises an extension system for deriving an extended image line section from an image line section of the electronic image signal, said extended image line section and said image line section containing the same information, and a combination unit for supplying an extended delayed image line section and an extended image line section substantially simultaneously.

2. An image display device as claimed in claim 1, characterized in that the extension unit comprises a memory and an interpolation unit.

3. An image display device as claimed in claim 1, characterized in that the cathode modulator comprises a delay system which is arranged to cooperate with the extension system in order to derive delayed extended image line sections from image line sections.

4. An image display device as claimed in claim 1, characterized in that the extension system comprises a memory and a repeater unit.

5. An image display unit as claimed in claim 1, characterized in that the cathode modulator is arranged to scan odd image lines by means of a first electron beam, and to scan even image lines by means of a second electron beam, an even and an odd image line being scanned substantially simultaneously.

6. An X-ray examination apparatus comprising means for forming an image signal corresponding to an image of an object under examination and an image display device as claimed in claim 1 for receiving said image signal and displaying said image.

7. An image display device as claimed in claim 3, characterized in that the extension system comprises a memory and a repeater unit.

8. An image display device as claimed in claim 7, characterized in that the extension unit comprises a memory and an interpolation unit.

9. An image display device as claimed in claim 3, characterized in that the extension unit comprises a memory and an interpolation unit.

10. An image display device as claimed in claim 4, characterized in that the extension unit comprises a memory and an interpolation unit.

11. An X-ray examination device as claimed in claim 6, characterized in that the cathode modulator comprises a delay system which is arranged to cooperate with the extension system in order to derive delayed extended image line sections from image line sections.

12. An X-ray examination device as claimed in claim 11, characterized in that the extension system comprises a memory and a repeater unit.

13. An X-ray examination device as claimed in claim 6, characterized in that the extension system comprises a memory and a repeater unit.

* * * * *